United States Patent [19]

Chant

[11] 3,867,221
[45] Feb. 18, 1975

[54] PREPARING AN ARTICLE OF THERMOSETTING RESIN

[76] Inventor: Peter R. Chant, Delft, Netherlands

[22] Filed: Apr. 16, 1973

[21] Appl. No.: 351,734

[30] Foreign Application Priority Data
Apr. 19, 1972 Great Britain.................. 18108/72

[52] U.S. Cl.................... 156/77, 156/222, 156/245, 156/295, 156/312, 161/160, 161/190, 264/45, 264/321
[51] Int. Cl............................................ B32b 5/18
[58] Field of Search......... 156/77, 78, 79, 222, 295, 156/245, 305, 308, 312; 264/55, 45, 321, 324, 271; 161/160, 161, 190

[56] References Cited
FOREIGN PATENTS OR APPLICATIONS
1,266,097  3/1972  Great Britain..................... 161/161

Primary Examiner—William J. Van Balen

[57] ABSTRACT

In the process for making a thermosetting resin article which comprises (a) impregnating an open-cell sheet with a thermosetting resin (b) applying a fibrous layer to at least one side of the sheet, (c) compressing the assembly so that the resin impregnates the fibrous layer, and (d) allowing the assembly to cure, the improvement comprising (e) allowing the resin in the fibrous layer to pass through a more advanced state of cure than the resin in the compressed sheet (f) reducing the compression on the sheet so that it expands and (g) allowing the assembly to cure throughout. Also a part of this invention is the thermosetting article made by this process.

4 Claims, No Drawings

PREPARING AN ARTICLE OF THERMOSETTING RESIN

BACKGROUND OF THE INVENTION

1. Field of the Invention. This invention relates to the method of producing an article of thermosetting resin and a novel thermosetting article.

2. Prior Art. It is generally known in the laminating art that an article which has relatively low density core but a relatively stiff strong outer layer can be prepared by several methods. (1) In one method the core is precut to the proper size and a reinforcing layer often a resin-reinforced glass layer, is then glued on the core using the proper adhesive. If necessary the assembly is then placed in a mold and cured. (2) Another method involves precutting the core then contacting one or both sides of the core with a combination of uncured resin and glass fiber, the assembly is then placed in a mold and heated and pressured so that the assembly is cured. In this case the resin acts as both the binder for the glass fiber and adhesive for the core. (3) In still another case the core is precut and a resin impregnated glass fiber mass is then wrapped around the core, the assembly is placed in the mold and heated and pressured so that the resin properly cures. In this case the resin acts not only as an adhesive agent but also the resin laminate combination envelopes the entire core. (4) In still another method a resin reinforced glass mat assembly is arranged to define a hollow space into which a foamable plastic is injected in order to foam and fill up the space.

Disadvantages of the first three methods is that the core must precut exactly to fit the mold which is a time consuming step especially when working with difficult shapes. In the second method there is a delamination problem, while in the second and third methods working with the resin is inordinantly messy. In the fourth method it is sometimes difficult to form the necessary space using the reinforced resin fibrous sheet.

In British Pat. No. 1,266,097, a process is described which presents an entirely new concept in the laminated articles area and which comprises:

a. impregnating sheets having open-cell foam structure with a curable thermosetting resin, b. applying a layer of fibers reinforcing material to at least one side of the impregnated foam sheet, c. compressing the foam sheet and reinforcing layer to the extent that any voids remaining in the sheet after impregnation with the resin are eliminated and the resin is expelled from the sheet into the fibrous reinforcing layers to impregnate this layer with resin throughout its thickness, and d. allowing the resin in the sheet and layer to cure while maintaining the compression.

This process results in a thermosetting resin article wherein the core is a dense, visually solid layer substantially without voids, which is layered on either side with the resin impregnated glass fiber layer, the thermosetting resin being distributed relatively uniformly throughout the article, i.e., the resin fills substantially all the voids in the compressed open cell sheet as well as uniformly impregnates the fibrous reinforcement.

The instant invention is an improvement of that process wherein instead of forming a dense, visually solid layer substantially without void between two reinforced glass fiber layers, an open-cell structured layer which is residually impregnated with thermosetting resin is sandwiched between two fiberglass reinforced layers. The article of the instant invention will have a density which is less than the thermosetting resin article prepared by the method disclosed in British Pat. No. 1,266,097.

SUMMARY OF THE INVENTION

This invention is directed to an improved method of producing an article of thermosetting resin and the novel article of thermosetting resin produced by that process.

In the process of producing an article of thermosetting resin which comprises:

a. impregnating a sheet having an open-cell structure with a curable thermosetting resin, b. applying a layer of fibrous reinforcing material to at least one side of the impregnated foam sheet, c. compressing the impregnated foam sheet and reinforcing layer to the extent that the resin is expelled from the sheet into the fibrous reinforcing layer to impregnate this layer with a resin throughout its thickness, and d. allowing the resin in the sheet and layer to cure while maintaining a compression, the improvement comprising e. at step (d), allowing the resin in the reinforcing layer to pass through a more advanced state of cure than the resin in the open cell sheet, f. reducing the compression of the open-cell sheet during this phase so that the sheet expands, and g. allowing the resin in the sheet and the layer to cure completely while the sheet is in the expanded state.

The thermosetting resin article made according to the process of this invention comprises:

a thermosetting resin, at least one fibrous layer which is uniformly impregnated with said resin, an open-cell structure sheet residually impregnated with said resin, said layer being prepared by compressing said open celled structure sheet in which at least 25 percent of the open-cell space is filled with said resin, to less than 30 percent of the original thickness then reducing the compression to allow said layer to expand to a thickness greater than its compressed thickness but less than its original uncompressed thickness, the uniformly impregnated layer being bound to the residually impregnated layer through the thermosetting resin.

PREFERRED EMBODIMENTS

Generally, the process of which this invention is an improvement is described in British Pat. No. 1,266,097 and as much of that patent as is pertinent is incorporated herein by reference.

The thermosetting resin suitable for use in this process includes phenolics, melamines, polyesters, epoxies and silicones. Generally, it is found that polyester and epoxy resins are eminently suitable in this particular process and for this reason are preferred. The thermosetting resins are converted to the thermoset form by cross-linking processes usually accomplished by the addition of a curing agent to the resin. Proper curing agent for epoxy and polyester resins are well known to those skilled in the art. See, for example chapters 5–12 of the Handbook of Epoxy Resins, Lee and Neville, McGraw Hill, Inc. 1967, for curing agents and mechanisms of cure for epoxy resins and chapter 6 of Reinholt Plastic Application Series, polyester resins, Lawrence, Rinehold Publishing Corp., 1967 for curing agents and mechanisms of cure for polyester resins. The resins will be in the liquid form so that the open-cell sheet can be properly impregnated. Of the epoxy resins, particularly preferred are the liquid glycidyl polyethers of ployhydric phenols, such as the diglycidyl ether of bisphenol A (BPA) made by reacting epichlorohydrin and BPA and generally having a molecular weight of about 350 to 400 and an epoxide equivalent of about 180 to 200.

The fibrous reinforcing layer used in the process of this invention can be one of many of the reinforcing layers known in the art such as cellulosic paper; cotton fabric; asbestos paper and fabric; nylon fabric; glass paper, mat or fabric; and metal filaments. The particular choice of reinforcing material of course will depend on the degree of stiffness required for the finished article. Particularly useful is glass and asbestos, reinforcing with glass paper, mat or fabric being preferred.

The sheet having open-cell structure acts as the reservoir for the resin as well as the foam core for the finished thermosetting resin article. This sheet or layer can be referred to as the reservoir sheet. Generally the sheet having the open-cell structure should be highly compressible, flexible, readily wettable by the liquid resin, and must possess an open connected cellular structure to allow essentially unobstructed passage of the liquid resin throughout the sheet. Sheets which are particularly useful in this regard include sheets of batting of natural or synthetic materials as long as the material does not react with the thermosetting resin which is used to impregnate the sheet, thus cotton batting is useable in this particular process. However, it is preferable to use a foam sheet which has an open-cell structure which is suitably made of a thermoplastic material, polyurethane, or an elastomer. Polyurethane is particularly useful in this regard.

The known process as described in British Pat. No. 1,266,097 involves impregnating the reservoir sheet with the resin, contacting at least one side of the impregnated sheet with a reinforcing layer, compressing the assembly so that the resin is expressed into the reinforcing layer uniformly, and allowing the resin to cure throughout. Generally, since the reservoir sheet is compressed to the point where substantially all the voids of the sheet are eliminated, it would be expected if the compression of the assembly were reduced, the resin would be re-absorbed into the open-cell sheet from the impregnated fibrous layer. However, it has been observed that when the curing of the compressed assembly formed by the foam sheet and reinforcing layers is effected in a heated mold, in which the assembly is compressed and heated by the walls of the mold, the resin near the surface of the assembly is heated more quickly and intensively than the resin in the more centrally located zones of the assembly, i.e., the resin which remains in the reservoir sheet. Since the reinforcing fibrous layer is relatively thin, as compared to the thickness of the foam layer, the curing process will pass through a phase in which the resin in the reinforcing layer (or both reinforcing layers if a reinforcing layer has been applied to both sides of the foam sheet) has cured to such a degree that it becomes hard, while the resin in the core of the assembly formed by the foam sheet is still relativly viscous because the curing process has produced less internally than in the other regions of the assembly. At this moment, the compression of the assembly is reduced by moving the walls of the mold apart and allowing the open-cell sheets to expand elastically. Because the resin in the reinforcing layer is nearly completely cured and is solid, it cannot be re-absorbed by the expanding reservoir sheets, thus the resin in the reinforcing layer will stay in that layer. Since the resin has wetted the reservoir sheet throughout the sheet it will be residually impregnated, i.e., the walls of the open-cell structure will have resin adhering thereto. Completion of the curing process until all the resin in the assembly has become firmly hardened will then result in a product having a rigid and strong skin of fiber reinforced resin, possibly also with some densely compacted resin impregnated sheet material but will have a more flexible core of expanded sheet material with a lower resin content than the foam adjacent to the reinforcement. Since the reservoir sheet will be residually impregnated with the resin because of the wettability of the sheet, the strength of the inner core will be increased due to the presence of the cured thermosetting resin while the reservoir sheet still retains certain degrees of elasticity due to the open-cell structure of the sheet.

The moment and extent of the reduction of compression of the assembly is dependent on various factors according to the desired quality of the products, and can best be established in each instance by making a few samples. The progress of the curing process is affected by the composition of the resin, the curing agent used, the type of reservoir sheet employed and the amount of external heat supplied. Within certain limits the proportion (thickness) of elastically deformable material in the core of the assembly will increase by advancing the moment of reduction of compression and by increasing the extent of the reduction of compression.

Where the compression is reduced to great extend the final thickness of the thermosetting resin article may approach the original thickness of the assembly. Accordingly, if, for example the reservoir sheet has been compressed to about 1 percent or less of the original thickness, reduction and compression may take place to 100 times the compressed thickness. However, if desired decompression may be applied so that the thickness of the compressed assembly increases by only 20 percent or so. Thus, it can be seen that the combined thickness of the reservoir sheet and reinforcing layer can be from 1.2 to 100 times the combined thickness of the layers directly before the compression is reduced. That is, the final product may be from about 1.2 percent to about 100 percent of the original thickness of the combined reinforcing layer and reservoir sheet. In general terms, the reservoir sheet will be allowed to expand to a thickness which is greater than its compressed thickness but no more than its original thickness.

The articles made according to this process differ from known articles in that the thermosetting resin impregnates the entire article. Previously known articles merely had a thermosetting resin reinforced fibrous layer adhesively secured to a foam core and was prepared either by attaching the thermosetting resin reinforced fibrous layer to the preformed core with an adhesive or forming a hollow structure and injecting a foamable composition into the hollow space to allow the foam to be made in place or by contacting the core with a fibrous layer impregnated with uncured resin, then allowing the assembly to cure. Here, the thermosetting resin not only uniformly impregnates the fibrous reinforcing layer but it also residually impregnates the open-cell structured layer which is the reservoir sheet and further binds the impregnated fibrous layer to the core through the thermosetting resin. Generally, the open cell structured layer which comprises the interior part of the overall thermosetting resin article of this invention is prepared by compressing the open-cell structure layer in which at least 25 percent of the open-cell space is filled with the thermosetting resin and compressing the still impregnated layer to less than 30 percent of its original thickness down to, for example, 1 percent, then reducing the compression to allow said layer to expand to a thickness which is more than the compressed thickness but somewhat less than its original thickness.

The products resulting from the process of the invention can be used, for example, as wall or floor elements in buildings, as crash padding for automobiles, or as sound reducing panels or structure. The invention may also find application where less stringent strength requirements for the core of the product permit a lower resin content in the core than in the zone adjacent to the surface of the product.

To illustrate the manner in which the invention may be carried out the following embodiment is given. It is to be understood, however, that this embodiment is set forth for the purpose of illustration and the invention is not to be regarded as limited to any specific materials or conditions recited herein.

EMBODIMENT I

A 40 mm thick flexible polyurethane foam sheet was impregnated with a liquid epoxy resin composition in a bath containing the resin composition. After removing excess resin from the sheet, it was partly cured in an oven for 75 seconds at 180°C until the resin reached the B-stage of the curing process. A glass fiber sheet was applied to both sides of the foam sheet, and the assembly was then placed in a mold. Molding pressure was applied to the assembly by moving the mold walls closer together until the thickness of the assembly had become 10 mm. The compressed assembly was heated by the mold, which had a temperature of 180° C, for 1 minute. The molding pressure was then released to the extent that the thickness of the assembly became 15 mm. After this, the assembly was again heated by the mold at 180° C for another minute, and then removed from the mold. The resin had completely cured throughout the assembly during the 2 minutes it had remained in the mold. The obtained product had a flexible core layer, some 5 mm thick, sandwiched between hard and rigid skins, whereby the product showed some elasticity when compressed as well as bending flexibility.

I claim as my invention:

1. In the process of producing an article of thermosetting resin which comprises:
   a. impregnating a flexible, compressible sheet having an open-cell foam structure with a curable thermosetting resin,
   b. applying a layer of fibrous reinforcing layer to at least one side of the impregnated sheet,
   c. compressing the impregnated sheet and reinforcing layer to the extent that resin is expelled from the sheet into the fibrous reinforcing layer to impregnate this layer with resin throughout its thickness, and
   d. heating the resin in the sheet and layer to cure while maintaining the compression, the improvement comprising;
   e. wherein the heating in (d) is greater in the reinforcing layer and the resin passes through a more advanced state of cure than the resin in the impregnated sheet,
   f. reducing the compression on the partially cured resin impregnated foam sheet and reinforcing layer to expand the same, and
   g. heating the foam sheet and reinforcing layer to completely cure the resin.

2. A process as in claim 1 wherein the open-celled compressible sheet is a polyurethane foam.

3. A process as in claim 2 wherein at least 25 percent of the open cell space is filled with thermosetting resin.

4. A process as in claim 1 wherein the thermosetting resin is an epoxy resin composition.

* * * * *

UNITED STATES PATENT OFFICE
CERTIFICATE OF CORRECTION

PATENT NO. : 3,867,221
DATED : February 18, 1975
INVENTOR(S) : PETER R. CHANT

It is certified that error appears in the above-identified patent and that said Letters Patent are hereby corrected as shown below:

Cover sheet between line [76] and line [22] insert

-- [73] Assignee: Shell Oil Company,

Houston, Texas --.

*Signed and Sealed this*

*second* Day of *September 1975*

[SEAL]

*Attest:*

RUTH C. MASON
*Attesting Officer*

C. MARSHALL DANN
*Commissioner of Patents and Trademarks*